US011916659B2

(12) United States Patent
Morimoto

(10) Patent No.: US 11,916,659 B2
(45) Date of Patent: Feb. 27, 2024

(54) STATION-SIDE DEVICE, OPTICAL COMMUNICATION SYSTEM, AND SEARCH METHOD

(71) Applicant: Mitsubishi Electric Corporation, Tokyo (JP)

(72) Inventor: Mitsuya Morimoto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/946,061

(22) Filed: Sep. 16, 2022

(65) Prior Publication Data

US 2023/0163873 A1  May 25, 2023

(30) Foreign Application Priority Data

Nov. 25, 2021  (JP) ................. 2021-191278

(51) Int. Cl.
*H04J 14/08* (2006.01)
(52) U.S. Cl.
CPC ................. *H04J 14/08* (2013.01)
(58) Field of Classification Search
CPC ....... H04J 14/08; H04B 10/27; H04B 10/272; H04B 10/0793
USPC .................................................. 398/100
See application file for complete search history.

(56) References Cited

U.S. PATENT DOCUMENTS

| 7,729,612 B2* | 6/2010 | Jiang | H04B 10/0793 |
| | | | 398/10 |
| 2010/0067901 A1* | 3/2010 | Mizutani | H04B 10/272 |
| | | | 398/20 |
| 2012/0033963 A1* | 2/2012 | Nose | H04L 12/2898 |
| | | | 398/1 |
| 2012/0315041 A1* | 12/2012 | Yoon | H04B 10/272 |
| | | | 398/58 |
| 2014/0369676 A1* | 12/2014 | Hamaoka | H04B 10/27 |
| | | | 398/25 |

FOREIGN PATENT DOCUMENTS

| AU | 2008229908 B2 * | 9/2011 | ......... H04B 10/0799 |
| CN | 109547100 A * | 3/2019 | ............ H04B 10/03 |
| CN | 111107449 B * | 9/2022 | ......... H04B 10/0791 |
| JP | 2011-55417 A | 3/2011 | |
| JP | 2011055417 A * | 3/2011 | |
| WO | WO-2011069386 A1 * | 6/2011 | ......... H04B 10/0793 |
| WO | 2013/140454 A1 | 9/2013 | |

* cited by examiner

*Primary Examiner* — Abbas H Alagheband
(74) *Attorney, Agent, or Firm* — XSENSUS LLP

(57) ABSTRACT

An OLT 110 includes an optical transmission/reception unit 111 to transmit and receive optical signals by time division; an abnormal-light-emission detection unit 112 to monitor the received optical signals, and detect a state in which the optical signals are being received for a predetermined period or longer as abnormal light emission in which the optical signals from one or more of the ONUs 130 are not received; an optical-communication control unit to sequentially select an ONU 130 one at a time from the plurality of ONUs 130 other than the one or more ONUs 130 as a target ONU 130, test whether the abnormal light emission is resolved by stopping transmission of the optical signal from each target ONU 130, and, if the abnormal light emission is resolved, specifies the target ONU 130 being tested as an ONU 130 that is a source of the abnormal light emission.

11 Claims, 17 Drawing Sheets

FIG. 2
| ONU ID | ONU STATE | ABNORMAL-LIGHT-EMISSION DETECTION STATE | CLASSIFICATION |
|---|---|---|---|
| 1 | Register | Normal | normal |
| 2 | Register | | normal |
| 3 | Register | | normal |
| 4 | Register | | normal |
| 5 | Deregister | | deregister |
| ⋮ | ⋮ | | ⋮ |
| n | Power off | | power off |
FIG. 3A
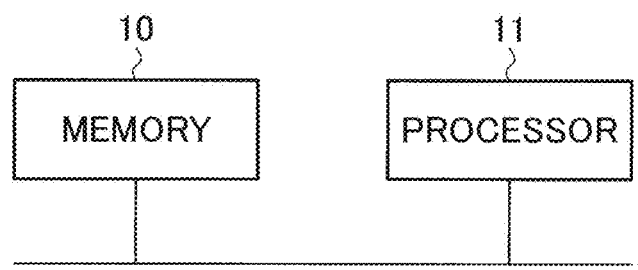
FIG. 3B
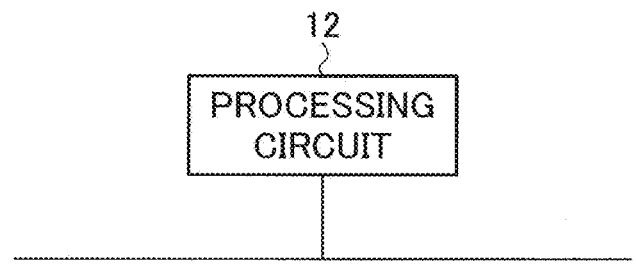

| ONU ID | ONU STATE | ABNORMAL-LIGHT-EMISSION DETECTION STATE | CLASSIFICATION |
|---|---|---|---|
| 1 | Register | Abnormal | normal |
| 2 | Register | | normal |
| 3 | Register | | normal |
| 4 | Register | | normal |
| 5 | Deregister | | deregister |
| ⋮ | ⋮ | | ⋮ |
| n | Power off | | power off |

| ONU ID | ONU STATE | ABNORMAL-LIGHT-EMISSION DETECTION STATE | CLASSIFICATION |
|---|---|---|---|
| 1 | Register | Abnormal | normal |
| 2 | Deregister | | normal |
| 3 | Deregister | | normal |
| 4 | Register | | normal |
| 5 | Deregister | | deregister |
| ⋮ | ⋮ | | ⋮ |
| n | Power off | | power off |

| ONU ID (113b) | ONU STATE (113c) | ABNORMAL-LIGHT-EMISSION DETECTION STATE (113d) | CLASSIFICATION (113e) |
|---|---|---|---|
| 1 | Register | Abnormal | normal |
| 2 | Deregister | | damaged |
| 3 | Deregister | | damaged |
| 4 | Register | | normal |
| 5 | Deregister | | deregister |
| ⋮ | ⋮ | | ⋮ |
| n | Power off | | power off |

| ONU ID (113b) | ONU STATE (113c) | ABNORMAL-LIGHT-EMISSION DETECTION STATE (113d) | CLASSIFICATION (113e) |
|---|---|---|---|
| 1 | Deregister | Abnormal | in test |
| 2 | Deregister | | damaged |
| 3 | Deregister | | damaged |
| 4 | Register | | normal |
| 5 | Deregister | | deregister |
| ⋮ | ⋮ | | ⋮ |
| n | Power off | | power off |

| ONU ID (113b) | ONU STATE (113c) | ABNORMAL-LIGHT-EMISSION DETECTION STATE (113d) | CLASSIFICATION (113e) |
|---|---|---|---|
| 1 | Deregister | Normal | suspected |
| 2 | Register | | normal |
| 3 | Register | | normal |
| 4 | Register | | normal |
| 5 | Deregister | | deregister |
| ⋮ | ⋮ | | ⋮ |
| n | Power off | | power off |

| ONU ID (113b) | ONU STATE (113c) | ABNORMAL-LIGHT-EMISSION DETECTION STATE (113d) | CLASSIFICATION (113e) |
|---|---|---|---|
| 1 | Register | Abnormal | tested |
| 2 | Deregister | | damaged |
| 3 | Deregister | | damaged |
| 4 | Register | | normal |
| 5 | Deregister | | deregister |
| ⋮ | ⋮ | | ⋮ |
| n | Power off | | power off |

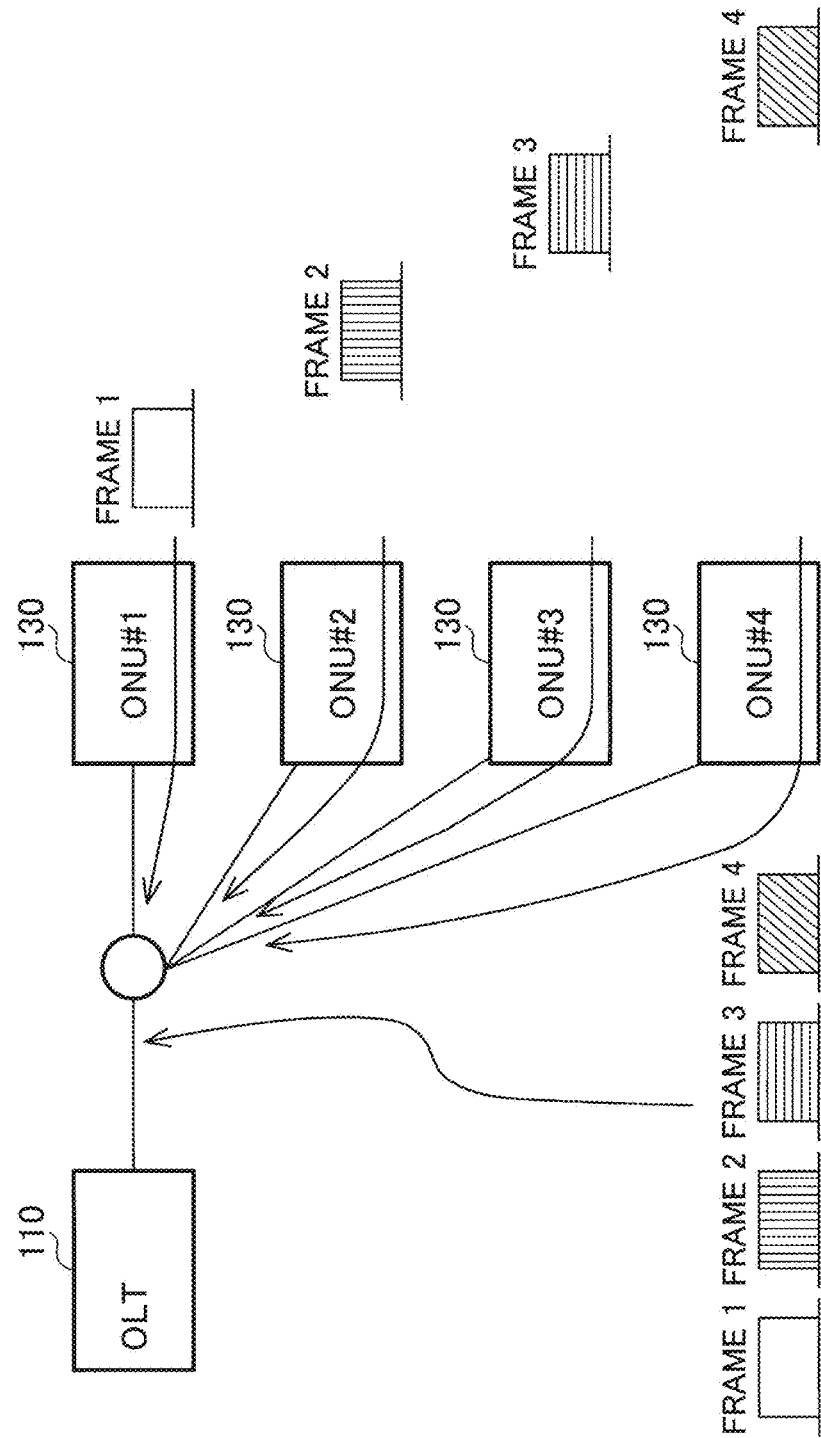

FIG. 14

| ONU ID | ONU STATE | ABNORMAL-LIGHT-EMISSION DETECTION STATE | CLASSIFICATION | TEST NUMBER |
|---|---|---|---|---|
| 1 | Register | Normal | normal | 0 |
| 2 | Register | | normal | 0 |
| 3 | Register | | normal | 0 |
| 4 | Register | | normal | 0 |
| 5 | Deregister | | deregister | 0 |
| ⋮ | ⋮ | | ⋮ | 0 |
| n | Power off | | power off | 0 |

| ONU ID (113b) | ONU STATE (113c) | ABNORMAL-LIGHT-EMISSION DETECTION STATE (113d) | CLASSIFICATION (113e) | TEST NUMBER (213f) |
|---|---|---|---|---|
| 1 | Register | Abnormal | normal | 1 |
| 2 | Deregister | | damaged | 0 |
| 3 | Deregister | | damaged | 0 |
| 4 | Register | | normal | 0 |
| 5 | Deregister | | deregister | 0 |
| ⋮ | ⋮ | | ⋮ | 0 |
| n | Power off | | power off | 0 |

| ONU ID (113b) | ONU STATE (113c) | ABNORMAL-LIGHT-EMISSION DETECTION STATE (113d) | CLASSIFICATION (113e) | TEST NUMBER (213f) |
|---|---|---|---|---|
| 1 | Deregister | Abnormal | in test | 1 |
| 2 | Deregister | | damaged | 0 |
| 3 | Deregister | | damaged | 0 |
| 4 | Register | | normal | 0 |
| 5 | Deregister | | deregister | 0 |
| ⋮ | ⋮ | | ⋮ | 0 |
| n | Power off | | power off | 0 |

| ONU ID (113b) | ONU STATE (113c) | ABNORMAL-LIGHT-EMISSION DETECTION STATE (113d) | CLASSIFI-CATION (113e) | TEST NUMBER (213f) |
|---|---|---|---|---|
| 1 | Deregister | Normal | suspected | 1 |
| 2 | Register | | normal | 0 |
| 3 | Register | | normal | 0 |
| 4 | Register | | normal | 0 |
| 5 | Deregister | | deregister | 0 |
| ⋮ | ⋮ | | ⋮ | 0 |
| n | Power off | | power off | 0 |

| ONU ID (113b) | ONU STATE (113c) | ABNORMAL-LIGHT-EMISSION DETECTION STATE (113d) | CLASSIFI-CATION (113e) | TEST NUMBER (213f) |
|---|---|---|---|---|
| 1 | Register | Normal | in test | 2 |
| 2 | Register | | normal | 0 |
| 3 | Register | | normal | 0 |
| 4 | Register | | normal | 0 |
| 5 | Deregister | | deregister | 0 |
| ⋮ | ⋮ | | ⋮ | 0 |
| n | Power off | | power off | 0 |

| ONU ID | ONU STATE | ABNORMAL-LIGHT-EMISSION DETECTION STATE | CLASSIFI-CATION | TEST NUMBER |
|---|---|---|---|---|
| 1 | Register | | in test | 2 |
| 2 | Deregister | | normal | 0 |
| 3 | Deregister | | normal | 0 |
| 4 | Register | Abnormal | normal | 0 |
| 5 | Deregister | | deregister | 0 |
| ⋮ | ⋮ | | ⋮ | 0 |
| n | Power off | | power off | 0 |

| ONU ID | ONU STATE | ABNORMAL-LIGHT-EMISSION DETECTION STATE | CLASSIFI-CATION | TEST NUMBER |
|---|---|---|---|---|
| 1 | Register | | in test | 2 |
| 2 | Deregister | | damaged | 0 |
| 3 | Deregister | | damaged | 0 |
| 4 | Register | Abnormal | normal | 0 |
| 5 | Deregister | | deregister | 0 |
| ⋮ | ⋮ | | ⋮ | 0 |
| n | Power off | | power off | 0 |

| ONU ID (113b) | ONU STATE (113c) | ABNORMAL-LIGHT-EMISSION DETECTION STATE (113d) | CLASSIFICATION (113e) | TEST NUMBER (213f) |
|---|---|---|---|---|
| 1 | Register | Normal | tested | 2 |
| 2 | Register | | normal | 0 |
| 3 | Register | | normal | 0 |
| 4 | Register | | normal | 0 |
| 5 | Deregister | | deregister | 0 |
| ⋮ | ⋮ | | ⋮ | 0 |
| n | Power off | | power off | 0 |

213a#7

STATION-SIDE DEVICE, OPTICAL COMMUNICATION SYSTEM, AND SEARCH METHOD

CROSS-REFERENCE TO RELATED APPLICATION

This application claims priority to Japanese Patent Application No. 2021-191278, filed on Nov. 25, 2021, the disclosure of which is incorporated herein by reference in its entirety.

BACKGROUND OF THE INVENTION

1. Field of the Invention

The disclosure relates to a station-side device, an optical communication system, and a search method.

2. Description of the Related Art

As a method for providing optical access services, such as fiber-to-the-home (FTTH), to users, there is a passive optical network (PON) technique.

In a PON system using the PON technique, multiple optical network units (ONUs) or subscriber-side devices are connected to an optical line terminal (OLT) or a station-side device. PON systems are capable of providing a high-speed access service at a low cost by using optical fibers as transmission lines. Today, ONUs are widely used in homes.

In a PON system, an OLT and multiple ONUs are connected by optical fibers, and in order for the OLT to correctly reproduce a signal, it is necessary to manage the optical transmission timings of the ONUs so that multiple ONUs do not simultaneously emit light. Thus, the OLT instructs a target ONU of the light emission timing to control the target ONU so as to emit light only at an instructed time.

In WO 2013/140454, Hamaoka discloses an OLT capable of specifying ONUs that are constantly emitting light. According to Hamaoka, when all ONUs other than a single ONU enter an unregistered state within a predetermined time, the OLT specifies the single ONU as an ONU that constantly emits light.

Searching for an ONU with a conventional technique may result in erroneously determining a normal ONU as an ONU in an abnormal state if the ONU is searched for, for example, during temporary resolution of abnormal light emission that is occurring irregularly. Such erroneous determination may result in normal ONUs being shut down one after another.

Accordingly, it is an object of one or more aspects of the disclosure to more accurately specifies ONUs that are the source of abnormal light emission.

SUMMARY OF THE INVENTION

A station-side device according to an aspect of the disclosure includes an optical transmission/reception unit configured to transmit and receive optical signals by time division to and from a plurality of subscriber-side devices; an abnormal-light-emission detection unit configured to monitor the optical signals received by the optical transmission/reception unit, and detect a state in which the optical signals are received for a predetermined period or longer as abnormal light emission in which the optical signals from one or more of the subscriber-side devices are not received; and an optical-communication control unit configured to sequentially select a subscriber-side device one at a time from the plurality of subscriber-side devices other than the one or more subscriber-side devices as a target subscriber-side device, test whether or not the abnormal light emission is resolved by stopping transmission of the optical signal from each target subscriber-side device via the optical transmission/reception unit, and, if the abnormal light emission is resolved, specifies the target subscriber-side device being tested as a causative subscriber-side device, the causative subscriber-side device being a subscriber-side device that is a source of the abnormal light emission.

An optical communication system according to another aspect of the disclosure includes: a plurality of subscriber-side devices; and a station-side device configured to transmit and receive optical signals to and from the plurality of subscriber-side devices, wherein, the station-side device comprises: an optical transmission/reception unit configured to transmit and receive an optical signal by time division to and from a plurality of subscriber-side devices; an abnormal-light-emission detection unit configured to monitor the optical signals received by the optical transmission/reception unit, and detect a state in which the optical signals are received for a predetermined period or longer as abnormal light emission in which the optical signals from one or more of the subscriber-side devices are not received; and an optical-communication control unit configured to sequentially select a subscriber-side device one at a time from the plurality of subscriber-side devices other than the one or more subscriber-side devices as a target subscriber-side device, test whether or not the abnormal light emission is resolved by stopping transmission of the optical signal from each target subscriber-side device via the optical transmission/reception unit, and, if the abnormal light emission is resolved, specifies the target subscriber-side device being tested as a causative subscriber-side device, the causative subscriber-side device being a subscriber-side device that is a source of the abnormal light emission.

A searching method according to another aspect of the disclosure includes the steps of: receiving optical signals by time division from a plurality of subscriber-side devices; monitoring the received optical signals, and detecting a state in which the optical signals are received for a predetermined period or longer as abnormal light emission in which the optical signals from one or more of the subscriber-side devices are not received; sequentially selecting a subscriber-side device one at a time from the plurality of subscriber-side devices other than the one or more subscriber-side devices as a target subscriber-side device, and testing whether or not the abnormal light emission is resolved by stopping transmission of the optical signal from each target subscriber-side device; and if the abnormal light emission is resolved, specifying the target subscriber-side device being tested as a causative subscriber-side device, the causative subscriber-side device being a subscriber-side device that is a source of the abnormal light emission.

According to one or more aspects of the disclosure, ONUs that are the source of abnormal light emission can be more accurately specified.

BRIEF DESCRIPTION OF THE DRAWINGS

FIG. 2 is a schematic diagram illustrating a first example of link-state management information according to the first embodiment.

FIGS. 3A and 3B are block diagrams illustrating hardware configuration examples.

FIG. 5 is a schematic diagram illustrating a second example of link-state management information according to the first embodiment.

FIG. 6 is a schematic diagram illustrating a third example of link-state management information according to the first embodiment.

FIG. 7 is a schematic diagram illustrating a fourth example of link-state management information according to the first embodiment.

FIG. 8 is a schematic diagram illustrating a fifth example of link-state management information according to the first embodiment.

FIG. 9 is a schematic diagram illustrating a sixth example of link-state management information according to the first embodiment.

FIG. 10 is a schematic diagram illustrating a seventh example of link-state management information according to the first embodiment.

FIG. 11 is a first schematic diagram for explaining the outline of the operation of a PON system according to the first embodiment.

FIG. 14 is a schematic diagram illustrating a first example of link-state management information according to the second embodiment.

FIG. 18 is a schematic diagram illustrating a second example of link-state management information according to the second embodiment.

FIG. 19 is a schematic diagram illustrating a third example of link-state management information according to the second embodiment.

FIG. 20 is a schematic diagram illustrating a fourth example of link-state management information according to the second embodiment.

FIG. 21 is a schematic diagram illustrating a fifth example of link-state management information according to the second embodiment.

FIG. 22 is a schematic diagram illustrating a sixth example of link-state management information according to the second embodiment.

FIG. 23 is a schematic diagram illustrating a seventh example of link-state management information according to the second embodiment.

FIG. 24 is a schematic diagram illustrating an eighth example of link-state management information according to the second embodiment.

DETAILED DESCRIPTION OF THE INVENTION

First Embodiment

Figure 1:
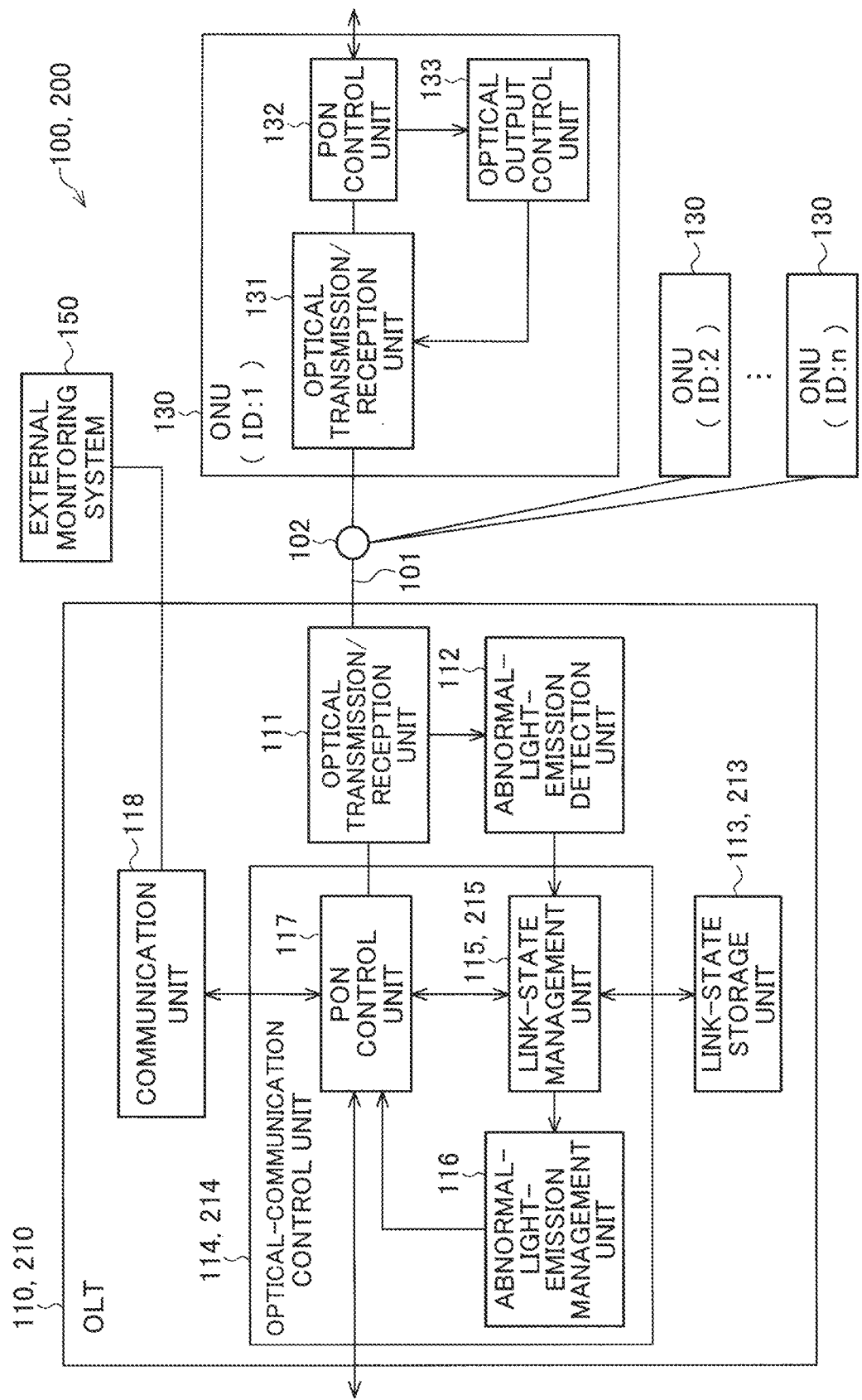
FIG. 1 is a block diagram schematically illustrating the configuration of a PON system according to first and second embodiments.

FIG. 1 is a block diagram schematically illustrating the configuration of a PON system 100 serving as an optical communication system according to the first embodiment.

The PON system 100 includes an OLT 110 or a station-side terminal device, and multiple ONUs 130.

In the PON system 100, the OLT 110 and the ONUs 130 are connected via an optical fiber 101 and an optical splitter 102.

The ONUs 130 are assigned identifications (IDs) serving as ONU identification information for identifying the respective ONUs 130. Here, positive integers are assigned as IDs in order from "1." In the following description, an ONU 130 having an ID=i may be represented as ONU #i. For example, the ONU 130 having the ID=1 may be represented as ONU #1. As illustrated in FIG. 1, i is a positive integer satisfying 1≤i≤n (where n is a positive integer greater than or equal to two).

The OLT 110 includes an optical transmission/reception unit 111, an abnormal-light-emission detection unit 112, a link-state storage unit 113, an optical-communication control unit 114, and a communication unit 118.

The optical transmission/reception unit 111 transmits and receives optical signals to and from the ONUs 130 by time division.

For example, the optical transmission/reception unit 111 receives an uplink signal from an ONU 130 and provides this signal to a PON control unit 117. The optical transmission/reception unit 111 transmits a downlink signal to an ONU 130. The optical transmission/reception unit 111 has a wavelength division multiplexing (WDM) function for multiplexing an uplink signal and a downlink signal.

The abnormal-light-emission detection unit 112 monitors the optical signals received by the optical transmission/reception unit 111, and detects a state in which an optical signal is being received for a predetermined period or longer as abnormal light emission, which is a state in which reception of optical signals from one or more of the ONUs 130 is disrupted.

For example, the abnormal-light-emission detection unit 112 monitors the uplink signals transmitted from an ONU 130 to the optical transmission/reception unit 111, detects abnormal light emission of the ONU 130 when a light emitting state continues for a predetermined period, and sends an abnormal light emission notification to a link-state management unit 115 to notify the link-state management unit 115 of the abnormal light emission of the ONU 130. If the link between the OLT 110 and each of the ONUs 130 is normal, each ONU 130 maintains the light emitting state for shorter than the predetermined period. Thus, if the light emitting state extends longer than or equal to the predetermined period, one of the ONUs 130 can be detected to be the source of abnormal light emission. If the light emitting state extending for the predetermined period is resolved, the abnormal-light-emission detection unit 112 provides an abnormal-light-emission resolution notification to the link-state management unit 115 to notify the link-state management unit 115 that the abnormal light emission of the ONU 130 has been resolved.

The link-state storage unit 113 stores link-state management information for managing the link state of the ONUs 130.

FIG. 2 is a schematic diagram illustrating an example of link-state management information according to the first embodiment.

As illustrated in FIG. 2, a link-state management table 113a, which is an example of link-state management information, is data in a table format containing an ID column 113b, an ONU state column 113c, an abnormal-light-emission detection state column 113d, and a classification column 113e.

The ID column 113b stores the IDs assigned to the ONUs 130.

The ONU state column 113c stores the ONU state, which is the state of each ONU 130. When an ONU 130 is linked with the OLT 110, the value "Register" is stored to indicate a registered state; when an ONU is not linked with the OLT 110, the value "deregister" is stored to indicate a deregistered state; and when the power of an ONU is turned off, the value "Power off" is stored to indicate a power-off state.

The abnormal-light-emission detection state column 113d stores an abnormal-light emission detection state value indicating whether or not abnormal light emission of an ONU 130 connected to the OLT 110 is detected. If abnormal light emission is detected in none of the ONUs 130 connected to the OLT 110, the value "Normal" indicating a normal light emitting state is stored, and if abnormal light emission is detected in any of the ONUs 130 connected to the OLT 110, the value "Abnormal" indicating an abnormal light emitting state is stored.

In the OLT 110, the classification column 113e stores the test state classification of the test conducted to check the light emitting state of the ONUs 130.

For example, if abnormal light emission is detected in none of the ONUs 130 connected to the OLT 110, that is, if the abnormal-light-emission detection state column 113d stores the value "Normal," the value "normal" indicating a normal state is stored in the classification column 113e if the ONU state column 113c stores the value "Register," and the same value as that in the ONU state column 113c is stored in the classification column 113e if the ONU state column 113c stores a value other than "Register."

On the other hand, if abnormal light emission is detected in an ONU 130 connected to the OLT 110, that is, if the value "Abnormal" is stored in the abnormal-light-emission detection state column 113d, the value stored in the classification column 113e is as follows: if the corresponding ONU 130 has been deregistered in response to the detection of abnormal light emission, stored is the value "damaged" indicating that the corresponding ONU 130 is not to be tested; if the corresponding ONU 130 is being tested, stored is the value "in test" indicating that the corresponding ONU 130 is being tested; if the test of the corresponding ONU 130 is completed, and it cannot be confirmed that there is not abnormal light emission, stored is the value "tested" indicating the completion of the test; and if there is a possibility of abnormal light emission of the corresponding ONU 130, stored is the value "suspected."

Referring back to FIG. 1, the optical-communication control unit 114 controls the communication of the OLT 110.

For example, when abnormal light emission that prevents reception of optical signals from one or more of the ONUs 130 is detected, the optical-communication control unit 114 selects an ONU 130 as a target ONU 130 one at a time from the ONUs 130 other than the one or more ONUs 130, tests whether or not the abnormal light emission can be resolved by stopping the transmission of optical signals from the target ONU 130 via the optical transmission/reception unit 111; and if the abnormal light emission is resolved, specifies the target ONU 130 at that time as a causative ONU 130 that is the source of the abnormal light emission.

The optical-communication control unit 114 includes a link-state management unit 115, an abnormal-light-emission management unit 116, and a PON control unit 117.

The link-state management unit 115 uses the link-state management information stored in the link-state storage unit 113 to manage the link state of each ONU 130 and the abnormal light emitting state of each ONU 130.

The link-state management unit 115 receives, from the PON control unit 117, notification of a change in or a request for the link state of each ONU 130, updates or confirms the link state of each ONU 130 in the link-state management information, and notifies the PON control unit 117 of the content of the update or confirmation.

The link-state management unit 115 receives an abnormal light emission notification or an abnormal-light-emission resolution notification from the abnormal-light-emission detection unit 112, and updates the abnormal-light-emission detection state value in the link-state management information to manage the abnormal-light-emission detection state of the ONUs 130.

The link-state management unit 115 also manages the test state classification of the test conducted to check the light emitting state in the link-state management information on the basis of the abnormal light emission notification or the abnormal-light-emission resolution notification from the abnormal-light-emission detection unit 112 and the link state of each ONU 130. On the basis of the link state of each ONU 130 and the test state classification of the test conducted to check the light emitting state, the link-state management unit 115 notifies the abnormal-light-emission management unit 116 of the ID of the ONU 130 to be the subject of ONU optical shutdown or ONU optical shutdown cancellation and an ONU optical shutdown flag or an ONU optical shutdown cancellation flag.

On the basis of the ID sent from the link-state management unit 115 and the ONU optical shutdown flag or the ONU optical shutdown cancellation flag, the abnormal-light-emission management unit 116 provides the PON control unit 117 with an ONU optical shutdown notification indicating that optical shutdown is to be performed on the ONU 130 corresponding to the ID or an ONU optical shutdown cancellation notification indicating that optical shutdown is to be canceled for the ONU 130 corresponding to the ID.

The PON control unit 117 comprehensively controls the processing by the OLT 110.

For example, the PON control unit 117 performs PON interface control.

Specifically, when the PON control unit 117 receives the ONU optical shutdown notification or the ONU optical shutdown cancellation notification from the abnormal-light-emission management unit 116, the PON control unit 117 transfers the ONU optical shutdown notification or the ONU optical shutdown cancellation notification to the ONU 130 via the optical transmission/reception unit 111.

The PON control unit 117 transmits warning information sent from an ONU 130 to an external monitoring system 150 via the communication unit 118, and provides the warning information to the link-state management unit 115.

The PON control unit 117 receives a setting or a request notification regarding the PON terminals between the OLT 110 and each ONU 130 from the external monitoring system 150 via the communication unit 118. The PON control unit 117 receives information on the link state of each ONU 130 from the external monitoring system 150 via the communication unit 118, provides the information to the link-state management unit 115, receives a response from the link-state management unit 115, and sends the response to the external monitoring system 150 via the communication unit 118.

The communication unit 118 communicates with the external monitoring system 150.

A portion or the entirety of the abnormal-light-emission detection unit 112 and the optical-communication control unit 114 described above can be implemented by, for example, a memory 10 and a processor 11, such as a central processing unit (CPU), that executes the programs stored in the memory 10, as illustrated in FIG. 3A. Such programs may be provided via a network or may be recorded and provided on a recording medium. That is, such programs may be provided as, for example, program products.

A portion or the entirety of the abnormal-light-emission detection unit 112 and the optical-communication control unit 114 can be implemented by, for example, a processing circuit 12, such as a single circuit, a composite circuit, a processor running on a program, a parallel processor running on a program, an application-specific integrated circuit (ASIC), or a field programmable gate array (FPGA), as illustrated in FIG. 3B.

As described above, the optical-communication control unit 114 can be implemented by processing circuitry.

The optical transmission/reception unit 111 can be implemented by an optical communication interface for performing optical communication via a connected optical fiber 101.

The communication unit 118 can be implemented by a communication interface, such as a network interface card (NIC) for wired or wireless communication.

The link-state storage unit 113 can be implemented by a volatile or non-volatile memory.

Referring back to FIG. 1, each ONU 130 includes an optical transmission/reception unit 131, a PON control unit 132, and an optical output control unit 133.

FIG. 1 illustrates the internal configuration of only the uppermost ONU 130, but the other ONUs 130 each have the same configuration.

The optical transmission/reception unit 131 receives a signal that is transmitted from the optical transmission/reception unit 111 of the OLT 110 through the optical fiber 101 and the optical splitter 102. The optical transmission/reception unit 131 feeds this signal to the PON control unit 132.

The optical transmission/reception unit 131 transmits signals fed from the PON control unit 132 to the OLT 110.

The optical transmission/reception unit 131 stops the emission of transmission light or cancels the stop of transmission light on the basis of notification for stopping the transmission light or notification for cancelling the stop of the transmission light issued by the optical output control unit 133.

The PON control unit 132 controls the processing by the ONU 130.

For example, the PON control unit 132 performs PON interface control.

Specifically, the PON control unit 132 performs PON termination processing on the ONU 130 side for the signal transmitted from the OLT 110 through the optical transmission/reception unit 111.

The PON control unit 132 notifies the OLT 110 of the warning information of the ONU 130 and the current status of the ONU 130 via the optical transmission/reception unit 131.

The PON control unit 132 transfers a downlink signal received from the optical transmission/reception unit 131 to an external terminal (not illustrated).

The PON control unit 132 provides the ONU optical shutdown notification or the ONU optical shutdown cancellation notification transmitted from the OLT 110 to the optical output control unit 133.

The optical output control unit 133 instructs the optical transmission/reception unit 131 to stop the transmission light emitted from the optical transmission/reception unit 131 or to cancel the stop of the transmission light on the basis of the ONU optical shutdown notification or the ONU optical shutdown cancellation notification fed from the PON control unit 132.

A portion or the entirety of the PON control unit 132 and the optical output control unit 133 described above can be composed of, for example, a memory 10 and a processor 11, such as a CPU, that executes the programs stored in the memory 10, as illustrated in FIG. 3A. Such programs may be provided via a network or may be recorded and provided on a recording medium. That is, such programs may be provided as, for example, program products.

Alternatively, a portion or the entirety of the PON control unit 132 and the optical-communication control unit 133 can be implemented by, for example, a processing circuit 12, such as a single circuit, a composite circuit, a processor running on a program, a parallel processor running on a program, an ASIC, or an FPGA, as illustrated in FIG. 3B.

As described above, the PON control unit 132 and the optical output control unit 133 can be implemented by processing circuitry.

The optical transmission/reception unit 111 can be implemented by an optical communication interface for performing optical communication via a connected optical fiber 101.

The operation of the OLT 110 for managing the link state of an ONU 130 will now be explained.

Figure 4:
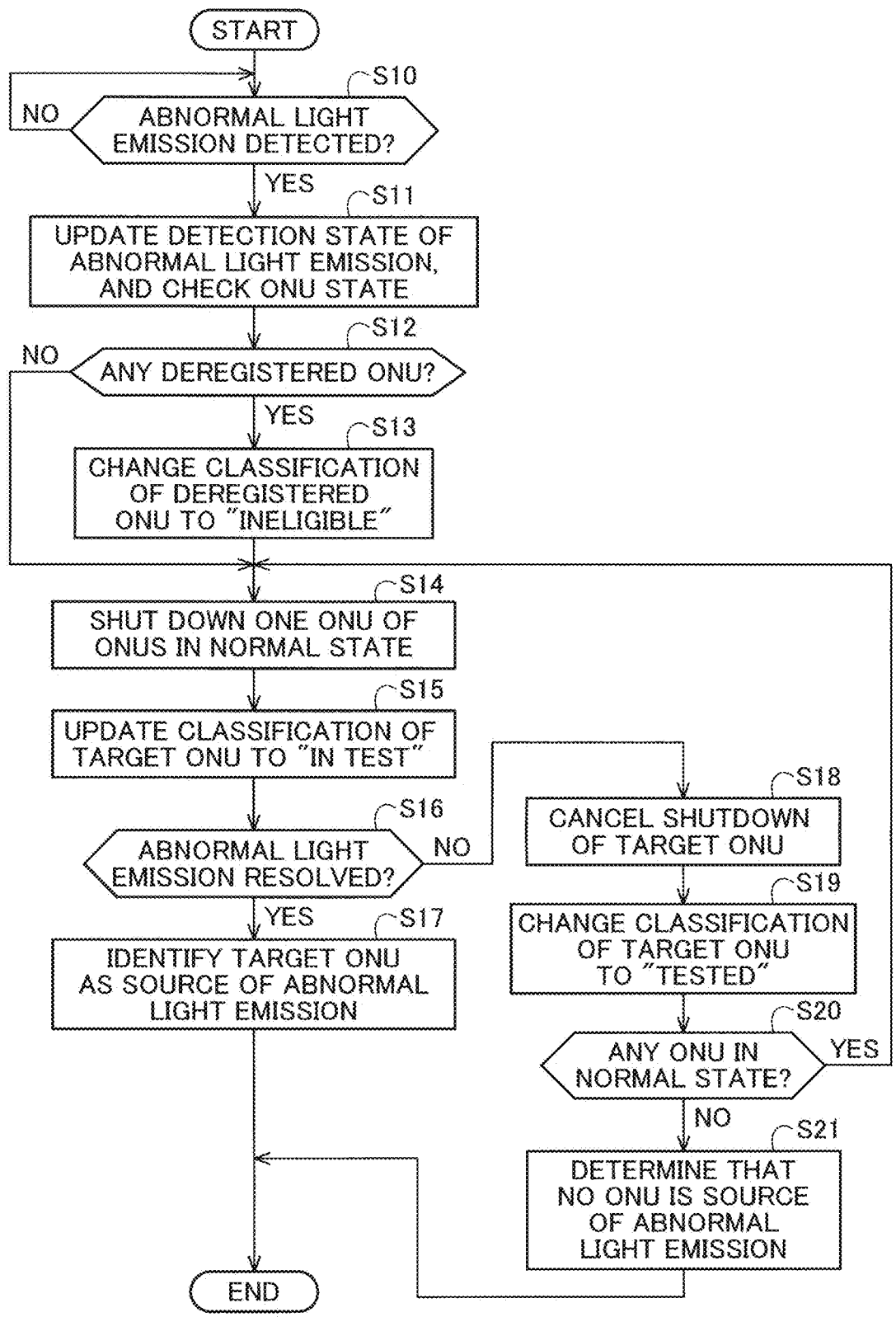
FIG. 4 is a flowchart illustrating the operation of an OLT searching for an ONU that is the source of abnormal light emission in the first embodiment.

FIG. 4 is a flowchart illustrating the operation of the OLT 110 searching for an ONU 130 that is the source of abnormal light emission.

When the ONU 130 that is the source of abnormal light emission is not connected to the OLT 110, the abnormal-light-emission detection state column 113d stores the value "Normal," as in the link-state management table 113a illustrated in FIG. 2.

First, the abnormal-light-emission detection unit 112 monitors the uplink signals transmitted from the ONU 130 to the optical transmission/reception unit 111 and determines whether or not abnormal light emission is detected (step S10). Here, the abnormal-light-emission detection unit 112 detects abnormal light emission when the light emitting state continues for a predetermined period. If abnormal light emission is detected (Yes in step S10), the abnormal-light-emission detection unit 112 provides an abnormal light emission notification of the corresponding ONU 130 to the link-state management unit 115, and the process proceeds to step S11.

When the link-state management unit 115 receives the abnormal light emission notification, the link-state management unit 115 updates the abnormal light emission detection state in the link-state management information stored in the link-state storage unit 113 so as to indicate the abnormal light emitting state, and checks the ONU state and the test state classification (step S11). For example, as in the link-state management table 113a #1 illustrated in FIG. 5, the link-state management unit 115 updates the value in the abnormal-light-emission detection state column 113d to "Abnormal" indicating an abnormal light emitting state, and checks the values in the ONU state column 113c and the classification column 113e.

The link-state management unit 115 then checks the ONU state and the test state classification of the link-state management information stored in the link-state storage unit 113, to determine whether or not there is an ONU 130 that had entered a deregistered state when the abnormal light emission was detected (step S12). When abnormal light emission is detected, the light emitting state of the relevant ONU 130 continues for a predetermined period; as a result, the optical signal transmitted from other ONUs 130 that are to transmit optical signals cannot be received during this period. Thus, as illustrated in the link-state management table 113a #2 illustrated in FIG. 6, there are ONUs 130 of which the value "normal" is stored in the classification column 113e and the value "Deregister" is stored in the ONU state column 113c. In the example illustrated in FIG. 6, ONU #2 and ONU #3 are the ONUs 130 in a deregistered state. If there is an ONU 130 in the deregistered state (Yes in step S12), the process proceeds to step S13, and if there is no ONU 130 in the deregistered state (No in step S12), the process proceeds to step S14.

In step S13, the link-state management unit 115 updates the test state classification of the test conducted for the ONU 130 that entered the deregistered state when the abnormal light emission was detected to be ineligible. For example, if ONU #2 and ONU #3 enter a deregistered state, as illustrated in FIG. 6, the link-state management unit 115 updates the values of ONU #2 and ONU #3 in the classification columns 113e to "damaged," as in the link-state management table 113a #3 illustrated in FIG. 7. The processing then proceeds to step S14.

In step S14, the link-state management unit 115 specifies one ONU 130 of the ONUs 130 whose test state classification is a normal state, and notifies the abnormal-light-emission management unit 116 of the ID and the optical shutdown flag of the specified ONU 130 so as to optically shut down the specified ONU 130. Here, the link-state management unit 115 specifies an ONU 130 one at a time in ascending order of the ID number. The ONU 130 specified here is also referred to as a target ONU 130. The abnormal-light-emission management unit 116 that has been notified of the ID and the optical shutdown flag generates an ONU optical shutdown notification indicating that the ONU 130 corresponding to the ID is to be optically shut down, and provides the ONU optical shutdown notification to the PON control unit 117. When the PON control unit 117 receives the ONU optical shutdown notification from the abnormal-light-emission management unit 116, the PON control unit 117 transfers the ONU optical shutdown notification to the corresponding ONU 130 via the optical transmission/reception unit 111.

The PON control unit 132 of the ONU 130 that has received the ONU optical shutdown notification provides the ONU optical shutdown notification to the optical output control unit 133, and the optical output control unit 133 causes the optical transmission/reception unit 131 to stop the emission of the transmission light and to transmit a response to the optical shutdown notification to the OLT 110. The OLT 110 that received such a response sends the response to the link-state management unit 115 via the PON control unit 117. The link-state management unit 115 updates the test state classification of the ONU 130 that has transmitted the response to the value "in test" (step S15). For example, as illustrated in FIG. 8, when a response is received from ONU #1, the value of ONU #1 in the classification column 113e in the link-state management table 113a #4 is updated to the value "in test." Note that when there is an ONU 130 in the "in test" state, the link-state management unit 115 does not allow an optical shutdown notification to be sent to other ONUs 130.

The abnormal-light-emission detection unit 112 then monitors the uplink signals transmitted from the ONU 130 to the optical transmission/reception unit 111 and determines whether or not the abnormal light emission is resolved after the execution of the ONU optical shutdown (step S16). Here, the abnormal-light-emission detection unit 112 monitors the uplink signals from the ONU 130 for a predetermined period and if the light emitting state is canceled within this period, determines that the abnormal light emission has been resolved. If the abnormal light emission is resolved (Yes in step S16), the abnormal-light-emission detection unit 112 provides an abnormal-light-emission resolution notification of the ONU 130 to the link-state management unit 115, and the processing proceeds to step S17. If the abnormal light emission is not resolved (No in step S16), the processing proceeds to step S18.

In step S17, since the abnormal light emission is resolved by shutting down the optical signal of the target ONU 130, the link-state management unit 115 specifies the target ONU 130 as the causative ONU 130 that is a source of the abnormal light emission. For example, if ONU #1 is the target ONU 130, the value in the classification column 113e of ONU #1 is updated to "suspected," as in the link-state management table 113a illustrated in FIG. 9. Note that in such a case, the ONU state of the ONU 130 that was a deregistered state returns to a registered state. Thus, for example, if ONU #2 and ONU #3 are in a deregistered state, as illustrated in FIG. 8, the values in the ONU state column 113c corresponding to ONU #2 and ONU #3 are updated to "Register," and the values in the classification column 113e corresponding to ONU #2 and ONU #3 are updated to "normal." Moreover, the value in the abnormal-light-emission detection state column 113d is updated to "Normal."

In step S18, since the abnormal light emission is not resolved even after the optical signal of the target ONU 130 has been shut down, the target ONU 130 is not the causative ONU 130. Thus, the link-state management unit 115 notifies the abnormal-light-emission management unit 116 of the ID of the target ONU 130 and the optical shutdown cancellation flag (step S18). The abnormal-light-emission management unit 116 that has been notified of the ID and the optical shutdown cancellation flag generates an ONU optical shutdown cancellation notification indicating that optical shutdown of the ONU 130 corresponding to the ID is to be canceled, and provides the ONU optical shutdown cancellation notification to the PON control unit 117. When the PON control unit 117 receives the ONU optical shutdown cancellation notification from the abnormal-light-emission management unit 116, the PON control unit 117 transfers the ONU optical shutdown cancellation notification to the corresponding ONU 130 via the optical transmission/reception unit 111.

The PON control unit 132 of the ONU 130 that has received the ONU optical shutdown cancellation notification provides the ONU optical shutdown cancellation notification to the optical output control unit 133, and the optical output control unit 133 causes the optical transmission/reception unit 131 to resume the emission of the transmission light and to transmit a response to the optical shutdown cancellation notification to the OLT 110. The OLT 110 that received such a response sends the response to the link-state management unit 115 via the PON control unit 117. The link-state management unit 115 updates the test state classification value of the target ONUs 130 to "tested" (step S19). For example, when a response is received from ONU #1, the value in the classification column 113e of ONU #1 is updated to "tested," as in the link-state management table 113a #6 illustrated in FIG. 10. The link between the target ONU 130 and the OLT 110 is restored by canceling the stop of the emission of the transmission light, and the PON controller 117 sends an ONU linkup notification to the link-state management unit 115 to update the ONU state of the target ONU 130 to a registered state. For example, when the target ONU 130 is ONU #1, the value in the ONU state column 113c of ONU #1 in the link-state management table 113a #6 is updated to "Register," as illustrated in FIG. 10.

The link-state management unit 115 then refers to the link-state management information stored in the link-state storage unit 113 to determine whether or not there are remaining ONUs 130 that are classified as being in a normal state (step S20).

If ONUs 130 classified as being in a normal state still remain (Yes in step S20), the processing returns o step S14, and the link-state management unit 115 specifies one of the ONUs 130 in the normal state as the target ONU. For example, in the link-state management table 113a #6 illustrated in FIG. 10, ONU #3 that has the smallest ID number out of the ONUs 130 of which the value in the classification column 113e is "normal" is specified as the next target ONU.

If there are no ONUs 130 of which the test state classification is "normal" (No in step S20), the processing proceeds to step S21.

In step S21, the link-state management unit 115 determines that none of the ONUs 130 performing uplink is in an abnormal light emitting state because the test state classification of all ONUs 130 is a state other than "normal." Thus, the link-state management unit 115 warn the external monitoring system 150 that the ONU that is the source of the abnormal light emitting state is unspecified through the PON control unit 117. This ends the search for the ONU 130 in an abnormal light emitting state.

The above operation in the flowchart will now be explained in detail with reference to FIGS. 11 to 13.

Figure 12:
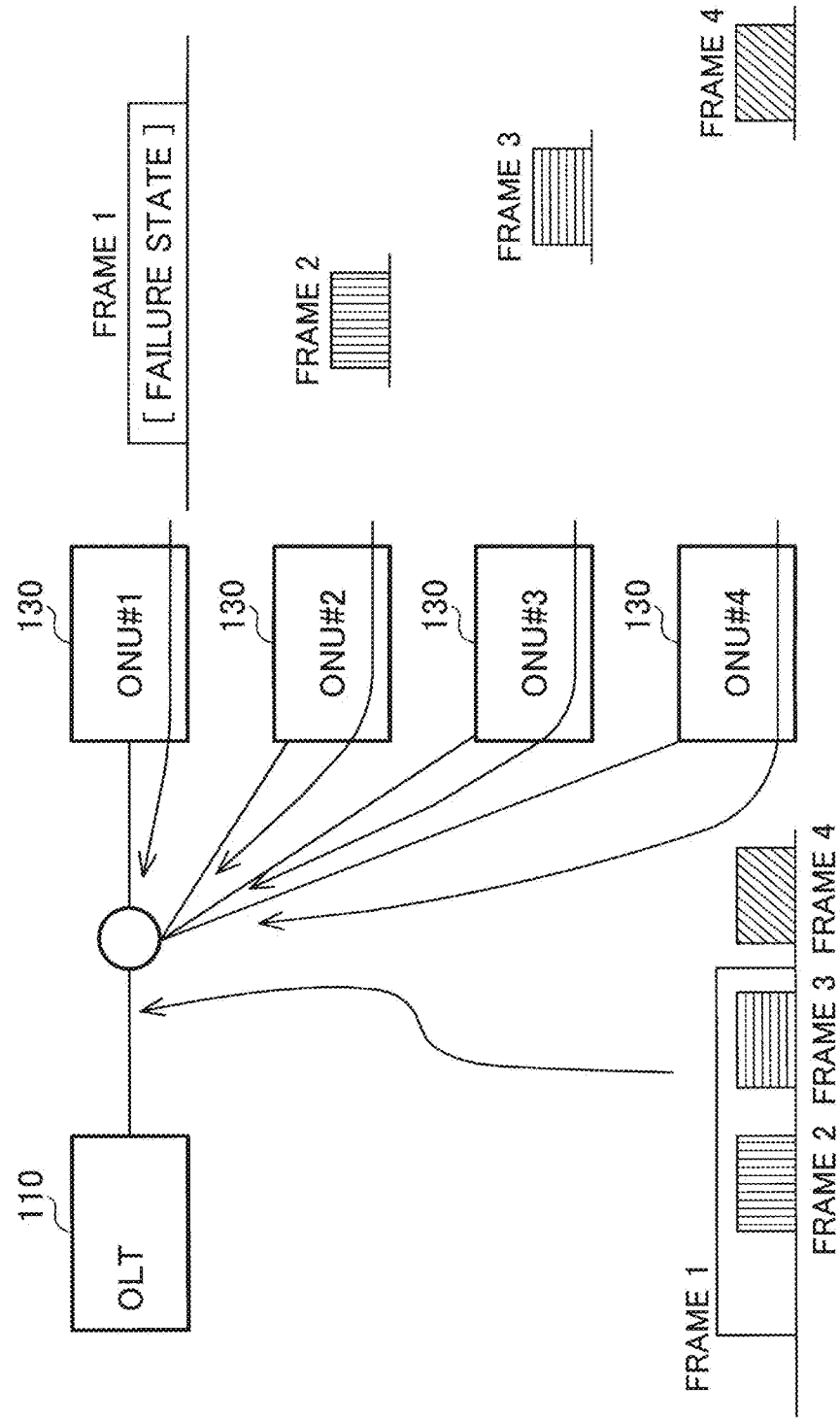
FIG. 12 is a second schematic diagram for explaining the outline of the operation of a PON system according to the first embodiment.
Figure 13:
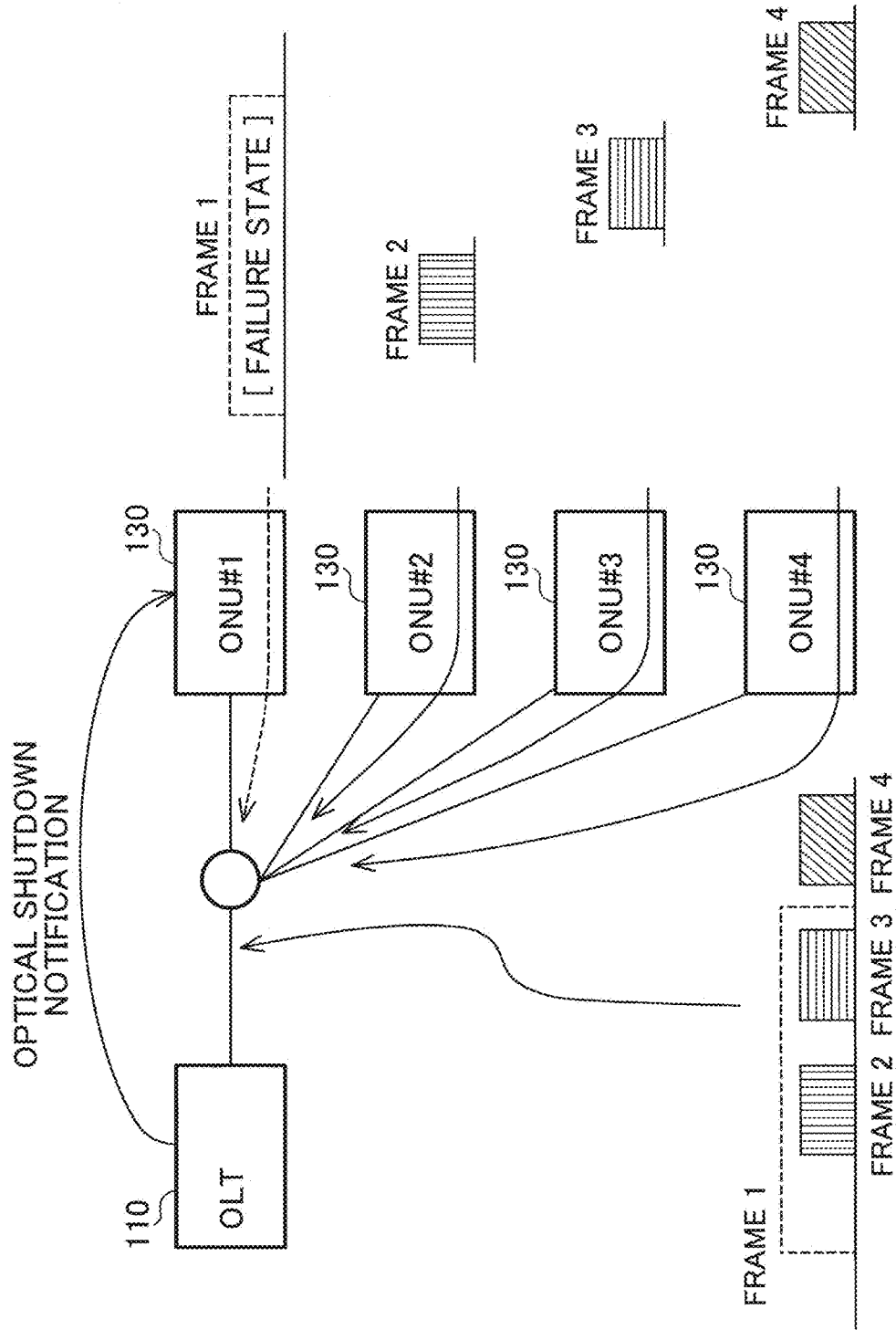
FIG. 13 is a third schematic diagram for explaining the outline of the operation of a PON system according to the first embodiment.

FIGS. 11 to 13 are schematic diagrams for explaining the outline of the operation of the PON system 100 according to the first embodiment.

In FIGS. 11 to 13, it is assumed that four ONUs 130 are connected to one OLT 110.

FIG. 11 illustrates the outline of the operation of each ONU 130 in a normal state.

Uplink frames 1 to 4 input to the respective ONUs 130 from a low-order terminal (not illustrated) are transmitted to the OLT 110 at respective timings under time division control.

Since the frames received by the OLT 110 are time-division multiplexed and transferred in a normal state and do not collide, the ONU state of each ONU 130 is indicated in the OLT 110 by the value "Register" indicating a registered state.

FIG. 12 illustrates the outline of the operation when a failure occurs in ONU #1, and abnormal uplink signals are generated irregularly.

When ONU #1 irregularly enters an abnormal light emitting state, the signals received by the OLT 110 are frame 1 transmitted from ONU #1, a signal resulting from a collision of frame 2 transmitted from ONU #2 and frame 3 transmitted from ONU #3, and frame 4 transmitted from ONU #4. In such a case, the OLT 110 cannot receive frames 2 and 3 correctly. Thus, in the OLT 110, the ONU state of ONU #1 and ONU #4 is set to the value "Register" indicating a registered state, and the ONU state of ONU #2 and ONU #3 is set to the value "Deregister" indicating a deregistered state.

FIG. 13 illustrates the outline of the operation when ONU #1 is detected as the source of abnormal light emission.

When the OLT 110 detects abnormal light emission of an ONU 130, the OLT 110 sequentially issues optical shutdown instructions to the ONUs 130 set to the value "Register" indicating a normal state. Here, by issuing an optical shutdown instruction to ONU #1, frame 1 colliding with frames 2 and 3 disappears, and the OLT 110 can receive frames 2 and 3. This causes ONU #2 and ONU #3 to return to the registered state, "Register."

Thus, the OLT 110 can specify ONU #1 as the causative ONU 130.

According to the first embodiment described above, it is possible to automatically search for and specify an ONU 130 that is irregularly emitting light during linkup without dedicated detection circuits provided in the OLT 110 and the ONUs 130. This allows the operator to take action without having to deal with the problem manually.

Second Embodiment

While the first embodiment describes a configuration for automatically searching for a device that is the source of irregular abnormal light emission, the second embodiment will describe a configuration for preventing erroneously specifying a normal device as the source of abnormal light emission while normal devices are being searched for during temporary resolution of the irregular abnormal light emission.

As illustrated in FIG. 1, a PON system 200 according to the second embodiment includes an OLT 210 or a station-side terminal device, and multiple ONUs 130.

The ONUs 130 in the PON system 200 according to the second embodiment are the same as the ONUs 130 in the PON system 100 according to the first embodiment.

The OLT 210 includes an optical transmission/reception unit 111, an abnormal-light-emission detection unit 112, a link-state storage unit 213, an optical-communication control unit 214, and a communication unit 118.

The optical transmission/reception unit 111, the abnormal-light-emission detection unit 112, and the communication unit 118 of the OLT 210 according to the second embodiment are respectively the same as the optical transmission/reception unit 111, the abnormal-light-emission detection unit 112, and the communication unit 118 of the OLT 110 according to the first embodiment.

The optical-communication control unit 214 controls the communication of the OLT 210.

The optical-communication control unit 214 of the second embodiment performs substantially the same processing as the optical-communication control unit 114 of the first embodiment, but in the second embodiment, the optical-communication control unit 214 stops the transmission of optical signals from target ONUs 130, counts the number of times that abnormal light emission has been resolved for each target ONU 130, and specifies a target ONU 130 of which this number exceeds a predetermined threshold as a causative ONU 130 that is the source of the abnormal light emission.

The link-state storage unit 213 stores link-state management information for managing the link state of the ONUs 130.

FIG. 14 is a schematic diagram illustrating an example of link-state management information according to the second embodiment.

As illustrated in FIG. 14, a link-state management table 213a, which is an example of link-state management information, is data in a table format having an ID column 113b, an ONU state column 113c, an abnormal-light-emission detection state column 113d, a classification column 113e, and a test number column 213f.

The ID column 113b, the ONU state column 113c, the abnormal-light-emission detection state column 113d, and the classification column 113e of the link-state management table 213a according to the second embodiment are respectively the same as the ID column 113b, the ONU state column 113c, the abnormal-light-emission detection state column 113d, and the classification column 113e of the link-state management table 113a according to the first embodiment.

The test number column 213f stores the number of times the corresponding ONU 130 is tested.

Here, stored is the number of times the ONU 130 is optically shut down and tested for whether the ONU 130 is the source of abnormal light emission.

The optical-communication control unit 214 includes a link-state management unit 215, an abnormal-light-emission management unit 116, and a PON control unit 117.

The abnormal-light-emission management unit 116 and the PON control unit 117 of the optical-communication control unit 214 according to the second embodiment are respectively the same as the abnormal-light-emission management unit 116 and the PON control unit 117 of the optical-communication control unit 114 according to the first embodiment.

The link-state management unit 215 uses the link-state management information stored in the link-state storage unit 213 to manage the link state and the abnormal light emitting state of each ONU 130.

The link-state management unit 215 according to the second embodiment performs substantially the same processing as the link-state management unit 115 according to the first embodiment, but if an ONU 130 is suspected multiple times to be the source of abnormal light emission while an ONU 130 that is the source of the abnormal light emission is being searched for, the suspected ONU 130 is specified as the source of the abnormal light emission.

The operation of the OLT 210 for managing the link state of an ONU 130 will now be explained.

Figure 15:
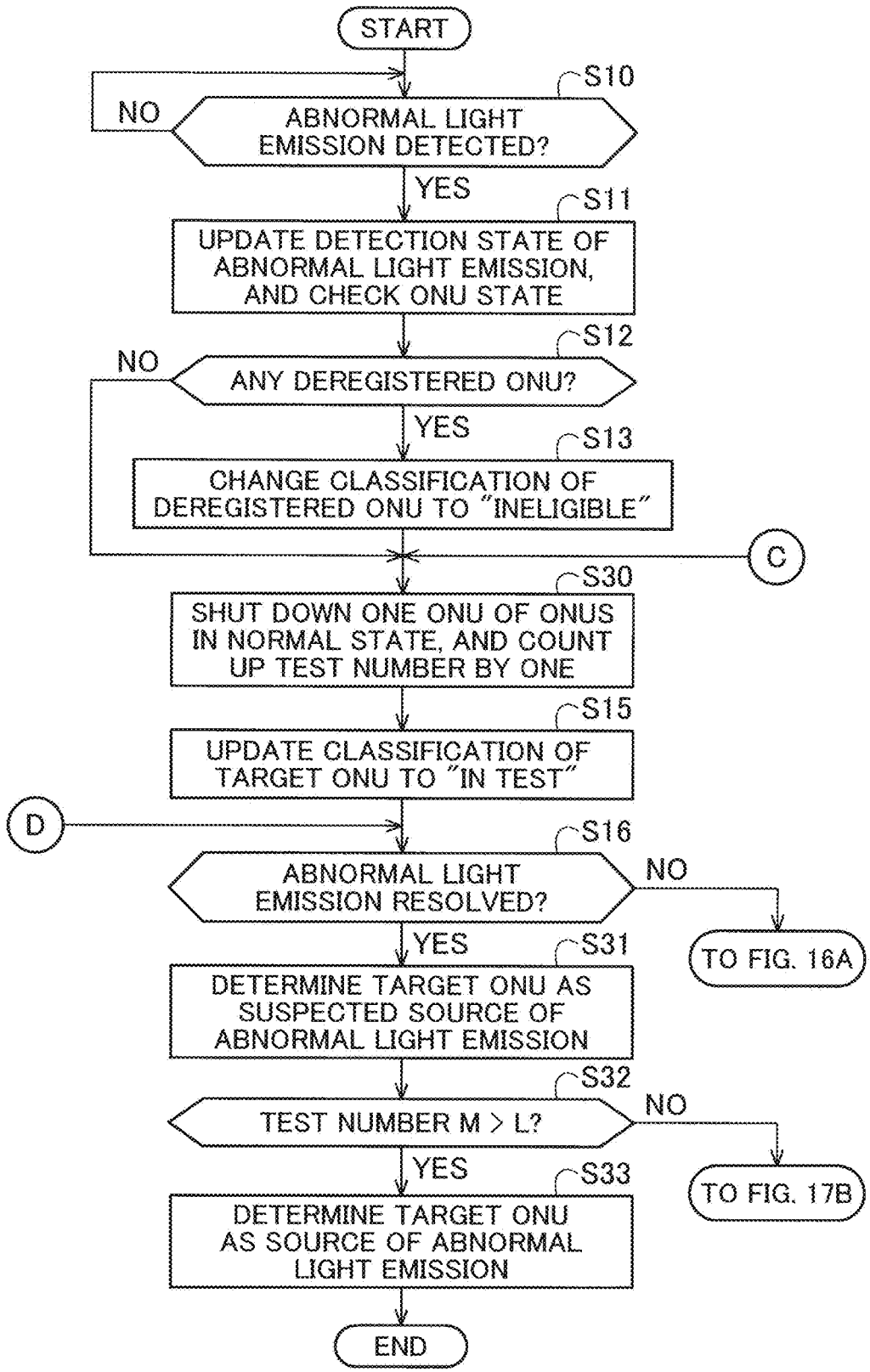
FIG. 15 is a first flowchart illustrating the operation of an OLT searching for an ONU that is the source of abnormal light emission in the second embodiment.
Figure 16:
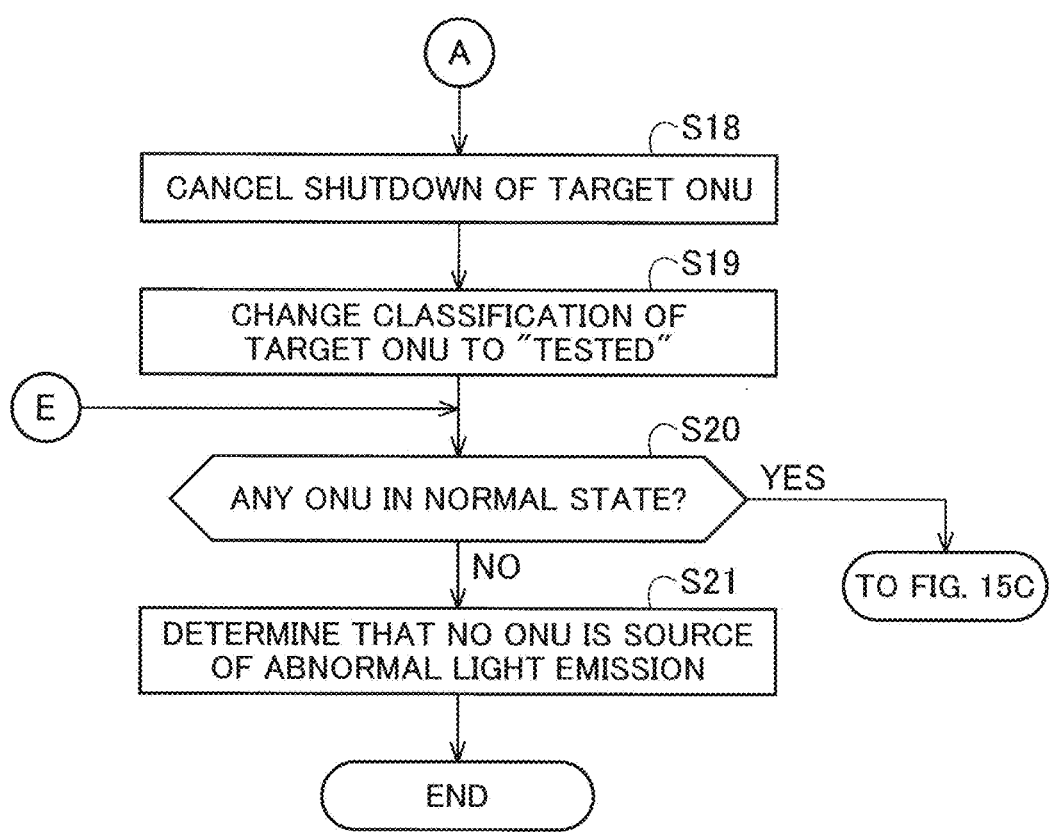
FIG. 16 is a second flowchart illustrating the operation of an OLT searching for an ONU that is the source of abnormal light emission in the second embodiment.
Figure 17:
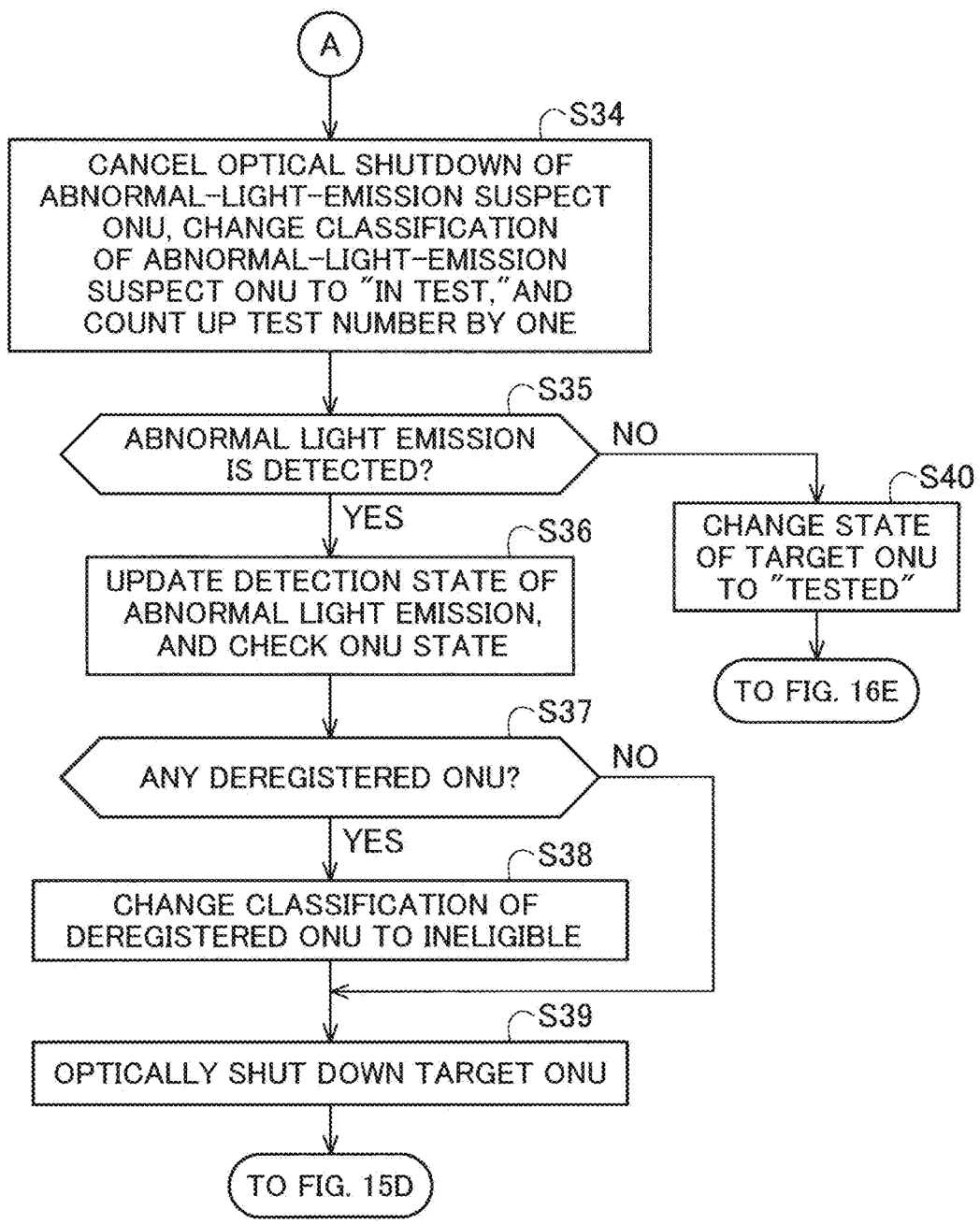
FIG. 17 is a third flowchart illustrating the operation of an OLT searching for an ONU that is the source of abnormal light emission in the second embodiment.

FIGS. 15 to 17 are flowcharts illustrating the operation of the OLT 210 searching for an ONU 130 that is the source of abnormal light emission.

If an ONU 130 that is the source of abnormal light emission is not connected to the OLT 210, the abnormal-light-emission detection state column 113d stores the value "Normal," and the test number column 213f stores the value "0" for all ONUs 130, as in the link-state management table 213a illustrated in FIG. 14.

Among the steps in the processing of the flowcharts illustrated in FIGS. 15 to 17, the steps that are the same as those in the flowchart illustrated in FIG. 4 of the first embodiment are denoted by the same reference numerals as those in FIG. 4.

The processing of steps S10 to S13 in the flowchart illustrated in FIG. 15 are respectively the same as the processing of steps S10 to S13 in the flowchart illustrated in FIG. 4. However, in FIG. 15, the processing proceeds to step S30 after the processing of step S13.

In step S30, the link-state management unit 215 specifies an ONU 130 of the ONUs 130 of which the test state classification value is "normal," and notifies the abnormal-light-emission management unit 116 of the ID and the optical shutdown flag of the specified ONU 130 so as to optically shut down the specified ONU 130. Here, the link-state management unit 215 specifies an ONU 130 one at a time in ascending order of the ID number. The ONU 130 specified here is also referred to as a target ONU 130. The abnormal-light-emission management unit 116 that has been notified of the ID and the optical shutdown flag generates an ONU optical shutdown notification indicating that the ONU 130 corresponding to the ID is to be optically shut down, and provides the ONU optical shutdown notification to the PON control unit 117. When the PON control unit 117 receives the ONU optical shutdown notification from the abnormal-light-emission management unit 116, the PON control unit 117 transfers the ONU optical shutdown notification to the corresponding ONU 130 via the optical transmission/reception unit 111.

Also, the link-state management unit 215 counts up by one the number of times the target ONU is tested in the specifies link-state management information stored in the link-state storage unit 213. For example, when the target ONU is ONU #1 and is tested for the first time, the value in the test number column 213f corresponding to ONU #1 is updated to "1," as in the link-state management table 213a #1 illustrated in FIG. 18. The processing then proceeds to step S15.

The processing of steps S15 and S16 in the flowchart illustrated in FIG. 15 are respectively the same as the processing of steps S15 and S16 in the flowchart illustrated in FIG. 4. However, in FIG. 15, if the abnormal light emission is resolved in step S16 (Yes in step S16), the abnormal-light-emission detection unit 112 provides an abnormal-light-emission resolution notification of the ONU 130 to the link-state management unit 215, and the processing proceeds to step S31; if the abnormal light emission is not resolved in step S16 (No in step S16), the processing proceeds to step S18 in FIG. 16.

For example, in step S14, the link-state management information is that in the link-state management table 213a #1 illustrated in FIG. 18, and if it is the first test, steps S15 and S16 in FIG. 15 are performed to update the link-state management information to that in the link-state management table 213a #2 illustrated in FIG. 19.

In step S31, since the abnormal light emission is resolved by the shutdown of the optical signal of the target ONU 130, the link-state management unit 215 suspects that the target ONU 130 is the source of the abnormal light emission and specifies the target ONU 130 as an abnormal-light-emission suspect ONU 130. For example, if ONU #1 is the target ONU, and the link-state management information after the determination in step S16 is that in the link-state management table 213a #2 illustrated in FIG. 19, the value in the classification column 113e of ONU #1 is updated to "suspected," as in the link-state management table 213a #3 illustrated in FIG. 20. In such a case, the ONU state of the ONUs 130 in the deregistered state returns to a registered state. Thus, for example, if ONU #2 and ONU #3 are in a deregistered state, the values corresponding to ONU #2 and ONU #3 in the ONU state column 113c are updated to "Register," and the values corresponding to ONU #2 and ONU #3 in the classification column 113e are updated to "normal." Moreover, the value in the abnormal-light-emission detection state column 113d is updated to "Normal."

The link-state management unit 215 then determines whether or not the number M of tests conducted on the target ONU 130 is larger than a predetermined threshold L (step S32). Here, the threshold L is an integer larger than or equal to one. If the number M of tests is larger than the threshold L (Yes in step S32), the processing proceeds to step S33; if the number M of tests is smaller than or equal to the threshold L (No in step S32), the processing proceeds to step S34 in FIG. 17.

In step S33, since the abnormal light emission is resolved by the shutdown of the optical signal of the target ONU 130 and the number of tests exceeds the threshold, the link-state management unit 215 specifies the target ONU 130 at this time as the causative ONU 130 that is the source of the abnormal light emission.

The processing of steps S18 to S21 in the flowchart illustrated in FIG. 16 are respectively the same as the processing of steps S18 to S21 in the flowchart illustrated in FIG. 4.

In step S34 of FIG. 17, the link-state management unit 215 cancels the optical shutdown of the abnormal-light-emission suspect ONU 130, sets the test state classification to "in test," and counts up the number of tests by one.

For example, the link-state management unit 215 notifies the abnormal-light-emission management unit 116 of the ID and the optical shutdown flag so as to optically shut down the abnormal-light-emission suspect ONU 130. The abnormal-light-emission management unit 116 that has been notified of the ID and the optical shutdown flag generates an ONU optical shutdown notification indicating that the ONU 130 corresponding to the ID is to be optically shut down, and provides the ONU optical shutdown notification to the PON control unit 117. When the PON control unit 117 receives the ONU optical shutdown notification from the abnormal-light-emission management unit 116, the PON control unit 117 transfers the ONU optical shutdown notification to the corresponding ONU 130 via the optical transmission/reception unit 111.

The link-state management unit 215 sets, in the link-state management information stored in the link-state storage unit 213, the value in the ONU state column 113c of the abnormal-light-emission suspect ONU 130 to "Register" indicating a registered state, and counts up by one the value in the test number column 213f of the abnormal-light-emission suspect ONU 130.

For example, if the link-state management information before the processing of step S34 is that in the link-state management table 213a #3 illustrated in FIG. 20, the value in the ONU state column 113c of ONU #1 is updated to "Register," the value in the classification column 113e of ONU #1 is updated to "in test," and the value in the test number column 213f of ONU #1 is updated to "2," as in the link-state management table 213a #4 illustrated in FIG. 21.

The abnormal-light-emission detection unit 112 then monitors the uplink signals transmitted from the ONU 130 to the optical transmission/reception unit 111 and determines whether or not abnormal light emission is detected (step S35). Here, the abnormal-light-emission detection unit 112 monitors the uplink signals from the ONU 130 for a certain period, and detects whether or not the light emitting state continues for a predetermined period. If abnormal light emission is detected (Yes in step S35), the processing proceeds to step S36; if no abnormal light emission is detected (No in step S35), the processing proceeds to step S39.

In step S36, the link-state management unit 215 receives an abnormal light emission notification from the abnormal-light-emission detection unit 112, and updates the abnormal light emission detection state in the link-state management information stored in the link-state storage unit 213 to an abnormal light emitting state.

For example, if the link-state management information before the processing of step S36 is as that in the link-state management table 213a #4 illustrated in FIG. 21, the link-state management unit 215 updates the value of the abnormal-light-emission detection state column 113d to "Abnormal" indicating an abnormal light emitting state, as in the link-state management table 213a #5 illustrated in FIG. 22.

The link-state management unit 115 then checks the ONU state and the test state classification in the link-state management information to determine whether or not there is an ONU 130 that had entered a deregistered state when the abnormal light emission was detected (step S37). When abnormal light emission is detected, the light emitting state of the relevant ONU 130 continues for a predetermined period; as a result, the optical signal transmitted from other ONUs 130 that are to transmit optical signals cannot be received during this period. Thus, for example, there are ONUs 130 of which the value "normal" is stored in the classification column 113e and the value "Deregister" is stored in the ONU state column 113c, as in the link-state management table 213a #5 illustrated in FIG. 22. In the example illustrated in FIG. 22, ONU #2 and ONU #3 are ONUs 130 in a deregistered state. If there is an ONU 130 in a deregistered state (Yes in step S37), the process proceeds to step S38; if there is no ONU 130 in a deregistered state (No in step S37), the process proceeds to step S39.

In step S38, the link-state management unit 215 updates the test state classification of the test conducted for the ONU 130 that entered the deregistered state when the abnormal light emission was detected to be ineligible. For example, when ONU #2 and ONU #3 are in a deregistered state, as illustrated in FIG. 22, the link-state management unit 215 updates the values of the classification columns 113e of ONU #2 and ONU #3 to "damaged," as in the link-state management table 213a #6 illustrated in FIG. 23. The process then proceeds to step S39.

In step S39, the link-state management unit 215 notifies the abnormal-light-emission management unit 116 of the ID and the optical shutdown flag to optically shut down the target ONU 130. The abnormal-light-emission management unit 116 that has been notified of the ID and the optical shutdown flag generates an ONU optical shutdown notification indicating that the ONU 130 corresponding to the ID is to be optically shut down, and provides the ONU optical shutdown notification to the PON control unit 117. When the PON control unit 117 receives the ONU optical shutdown notification from the abnormal-light-emission management unit 116, the PON control unit 117 transfers the ONU optical shutdown notification to the corresponding ONU 130 via the optical transmission/reception unit 111.

The PON control unit 132 of the ONU 130 that has received the ONU optical shutdown notification provides the ONU optical shutdown notification to the optical output control unit 133, and the optical output control unit 133 causes the optical transmission/reception unit 131 to stop the emission of the transmission light and to transmit a response to the optical shutdown notification to the OLT 110. The process then returns to step S16 in FIG. 15.

Since the abnormal light emission is not detected even when the optical signal of the target ONU 130 is shut down, the target ONU 130 is not the causative ONU 130 in step S40. Thus, the link-state management unit 215 updates the test state classification of the test conducted for the target ONU 130 in the link-state management information stored in the link-state storage unit 213 to "tested." For example, if the link-state management information before the processing of step S40 is as that in the link-state management table 213a #4 illustrated in FIG. 21, the link-state management unit 215 updates the value of the classification column 113e of ONU #1 to "tested," as in the link-state management table 213a #7 illustrated in FIG. 24. The process then returns to step S20 in FIG. 16.

According to the second embodiment as described above, when a normal ONU 130 is being tested at a timing at which irregular abnormal light emission is temporarily resolved, erroneously determining the normal ONU 130 as the ONU 130 that is source of the abnormal light emission can be avoided by testing the ONU 130 multiple times.

In the first and second embodiments, the ONUs 130 are optically shut down one at a time while searching for the ONU 130 that is the source of abnormal light emission, but the first or second embodiment is not limited to such an example. For example, multiple ONUs 130 may be optically shut down at once to reduce the number of searches performed to find one ONU 130 that is the source of abnormal light emission. Specifically, if the abnormal light emission is resolved when multiple ONUs 130 are optically shut down, these ONUs 130 may be optically shut down one at a time to reduce the number of searches.

DESCRIPTION OF REFERENCE CHARACTERS

100, 200 PON system; 110, 210 OLT; 111 optical transmission/reception unit; 112 abnormal-light-emission detection unit; 113, 213 link-state storage unit; 114, 214 optical-communication control unit; 115, 215 link-state management unit; 116 abnormal-light-emission management unit; 117 PON control unit; 118 communication unit; 130 ONU; 131 optical transmission/reception unit; 132 PON control unit; 133 optical output control unit.

What is claimed is:

1. A station-side device comprising:
   an optical communication interface to transmit and receive optical signals by time division to and from a plurality of subscriber-side devices; and
   processing circuitry to
      monitor the optical signals received by the optical communication interface,
      detect a state in which the optical signals are being received for a predetermined period or longer as abnormal light emission in which the optical signals from one or more of the subscriber-side devices are not received,
      sequentially select a subscriber-side device one at a time from the plurality of subscriber-side devices other than the one or more subscriber-side devices as a target subscriber-side device,
      test whether or not the abnormal light emission is resolved by stopping transmission of the optical signal from each target subscriber-side device via the optical communication interface, and
      specify, if the abnormal light emission is resolved, the target subscriber-side device being tested as a causative subscriber-side device, the causative subscriber-side device being a subscriber-side device that is a source of the abnormal light emission.

2. The station-side device according to claim 1, wherein the processing circuitry counts a number of times the abnormal light emission is resolved for each target subscriber-side device by stopping transmission of the optical signals from each target subscriber-side device, and specifies the target subscriber-side device of which the number of times exceeds a predetermined threshold as the causative subscriber-side device.

3. The station-side device according to claim 1, wherein the optical communication interface is configured to perform wavelength division multiplexing (WDM) to multiplex uplink and downlink signals.

4. The station-side device according to claim 1, wherein in the station-side device, the processing circuitry stores a unique identifier for each subscriber-side device in association with subscriber-side device state information, subscriber-side device abnormal-light-emission-detection information, and subscriber-side device classification information.

5. The station-side device according to claim 1, wherein, if the abnormal light emission is not resolved, the processing circuitry
   causes the target subscriber-side device to resume light transmission, and
   stores, in association with an identifier of the target subscriber-side device, an indication that the target subscriber-side device has been tested.

6. The station-side device according to claim 1, wherein the processing circuitry outputs a warning to an external monitoring system if the abnormal light emission is not resolved and all subscriber-side devices have been tested.

7. An optical communication system comprising:
   a plurality of subscriber-side devices; and
   a station-side device configured to transmit and receive optical signals to and from the plurality of subscriber-side devices, wherein,
   the station-side device comprises:
      an optical communication interface to transmit and receive optical signals by time division to and from a plurality of subscriber-side devices; and
      processing circuitry to
         monitor the optical signals received by the optical communication interface,
         detect a state in which the optical signals are being received for a predetermined period or longer as abnormal light emission in which the optical signals from one or more of the subscriber-side devices are not received,
         sequentially select a subscriber-side device one at a time from the plurality of subscriber-side devices other than the one or more subscriber-side devices as a target subscriber-side device,
         test whether or not the abnormal light emission is resolved by stopping transmission of the optical signal from each target subscriber-side device via the optical communication interface, and
         specify, if the abnormal light emission is resolved, the target subscriber-side device being tested as a causative subscriber-side device, the causative subscriber-side device being a subscriber-side device that is a source of the abnormal light emission.

8. The optical communication system according to claim 7, wherein each of the plurality of subscriber-side devices has a unique identifier.

9. The optical communication system according to claim 8, wherein the unique identifier is sequentially assigned for each of the plurality of subscriber-side devices.

10. The optical communication system according to claim 8, wherein in the station-side device, the processing circuitry stores the unique identifier for each subscriber-side device in association with subscriber-side device state information, subscriber-side device abnormal-light-emission-detection information, and subscriber-side device classification information.

11. A searching method comprising:
- receiving optical signals by time division from a plurality of subscriber-side devices;
- monitoring the received optical signals, and detecting a state in which the optical signals are received for a predetermined period or longer as abnormal light emission in which the optical signals from one or more of the subscriber-side devices are not received;
- sequentially selecting a subscriber-side device one at a time from the plurality of subscriber-side devices other than the one or more subscriber-side devices as a target subscriber-side device, and testing whether or not the abnormal light emission is resolved by stopping transmission of the optical signal from each target subscriber-side device; and
- if the abnormal light emission is resolved, specifying the target subscriber-side device being tested as a causative subscriber-side device, the causative subscriber-side device being a subscriber-side device that is a source of the abnormal light emission.

\* \* \* \* \*